United States Patent
Iwai et al.

(10) Patent No.: US 10,520,324 B2
(45) Date of Patent: Dec. 31, 2019

(54) ROUTE SEARCH DEVICE, CONTROL METHOD, PROGRAM AND STORAGE MEDIUM

(71) Applicants: PIONEER CORPORATION, Tokyo (JP); INCREMENT P CORPORATION, Tokyo (JP)

(72) Inventors: Tomoaki Iwai, Kawasaki (JP); Yuji Tawaragi, Kawasaki (JP); Tomoyuki Fujieda, Kawasaki (JP); Tetsuya Kawahara, Kawasaki (JP); Youko Fujita, Kawasaki (JP)

(73) Assignees: PIONEER CORPORATION, Tokyo (JP); INCREMENT P CORPORATION, Tokyo (JP)

( * ) Notice: Subject to any disclaimer, the term of this patent is extended or adjusted under 35 U.S.C. 154(b) by 139 days.

(21) Appl. No.: 15/694,683

(22) Filed: Sep. 1, 2017

(65) Prior Publication Data
US 2018/0023966 A1    Jan. 25, 2018

Related U.S. Application Data (63) Continuation of application No. PCT/JP2015/056198, filed on Mar. 3, 2015.

(51) Int. Cl.
*G01C 21/34* (2006.01)
*G05D 1/02* (2006.01)
(Continued)

(52) U.S. Cl.
CPC ......... *G01C 21/3407* (2013.01); *G05D 1/021* (2013.01); *G01C 21/3415* (2013.01);
(Continued)

(58) Field of Classification Search
CPC .................. G01C 21/3407; G01C 21/26; G01C 21/3415; G01C 21/367; G05D 1/0282;
(Continued)

(56) References Cited

U.S. PATENT DOCUMENTS

| 10,126,430 B2 | 11/2018 | Matsumoto |
| 2013/0110343 A1 | 5/2013 | Ichikawa et al. |

(Continued)

FOREIGN PATENT DOCUMENTS

| DE | 102012016802 A1 | 2/2014 |
| DE | 102013210395 A1 | 12/2014 |

(Continued)

OTHER PUBLICATIONS

Extended European Search Report for related EP App No. 15883916.7 dated Oct. 15, 2018, 9 pgs.

(Continued)

*Primary Examiner* — Brian P Sweeney
(74) *Attorney, Agent, or Firm* — Procopio, Cory, Hargreaves & Savitch LLP (57) ABSTRACT

An enhanced map information processing unit 14 of a driving assistance device 1 acquires from a determination unit 13 information on surroundings of a vehicle which is needed to perform autonomous driving, and acquires from a server device 2 environment information on surroundings of a route on which autonomous driving is performed. On the basis of the acquired environment information, the enhanced map information processing unit 14 extracts, as an autonomous driving unsuitable location Pn, a location at which the accuracy of the acquirement of the sensor unit 12 is predicted not to satisfy a standard for acquiring the information on the surroundings of the vehicle needed to perform
(Continued)

autonomous driving. An informing unit 18 alerts the extracted autonomous driving unsuitable location Pn to a user.

7 Claims, 6 Drawing Sheets

(51) Int. Cl.
*G01C 21/36* (2006.01)
*G05D 1/00* (2006.01)

(52) U.S. Cl.
CPC ......... *G01C 21/367* (2013.01); *G05D 1/0088* (2013.01); *G05D 1/0276* (2013.01)

(58) Field of Classification Search
CPC .... G05D 1/0274; G05D 1/0061; G05D 1/021; G05D 1/0088; G05D 1/0276; G08G 1/16; G08G 1/0969; G08G 1/096833; G08G 1/0145; G08G 1/0112; B60W 30/00
USPC .......................................... 701/423
See application file for complete search history.

(56) References Cited

U.S. PATENT DOCUMENTS

| | | |
|---|---|---|
| 2014/0222278 A1 | 8/2014 | Fujita |
| 2015/0066270 A1 | 3/2015 | Ogawa |
| 2015/0217763 A1 | 8/2015 | Reichel et al. |
| 2015/0266489 A1 | 9/2015 | Solyom et al. |
| 2015/0316386 A1 | 11/2015 | Delp |
| 2016/0257307 A1 | 9/2016 | Delp |
| 2016/0298976 A1 | 10/2016 | Sato et al. |
| 2016/0305787 A1 | 10/2016 | Sato et al. |
| 2016/0368491 A1 | 12/2016 | Hauler et al. |
| 2017/0010613 A1 | 1/2017 | Fukumoto |
| 2017/0219364 A1 | 8/2017 | Lathrop et al. |
| 2018/0023966 A1 | 1/2018 | Iwai et al. |
| 2018/0087907 A1 | 3/2018 | DeBitetto et al. |
| 2018/0275656 A1 | 9/2018 | Zhu |
| 2019/0064813 A1 | 2/2019 | Binet et al. |
| 2019/0108539 A1 | 4/2019 | Watanabe et al. |
| 2019/0162547 A1 | 5/2019 | Ootsuji |

FOREIGN PATENT DOCUMENTS

| | | |
|---|---|---|
| EP | 2749468 A1 | 7/2014 |
| JP | 2011-118603 A | 6/2011 |
| JP | 2013-036856 A | 2/2013 |
| JP | 2014-106854 A | 6/2014 |
| JP | 2015141478 | 8/2015 |
| WO | 2011158347 A1 | 12/2011 |
| WO | 2013027803 A1 | 2/2013 |
| WO | 2014139821 A1 | 9/2014 |

OTHER PUBLICATIONS

Non-Final Office Action in related U.S. Appl. No. 15/555,476 dated Feb. 4, 2019, 34 pgs.
International Search Report and Written Opinion for PCT App No. PCT/JP2015/056198 dated May 26, 2015, 8 pgs.
U.S. Final Office Action for related U.S. Appl. No. 15/555,476, dated Aug. 15, 2019, 25 pages.

ROUTE SEARCH DEVICE, CONTROL METHOD, PROGRAM AND STORAGE MEDIUM

CROSS-REFERENCE TO RELATED APPLICATIONS

This application is a continuation of PCT Application No. PCT/JP2015/056198, filed on Mar. 3, 2015, the contents of which are incorporated herein by reference.

TECHNICAL FIELD

The present invention relates to a technology for autonomous driving.

BACKGROUND TECHNIQUE

Conventionally, there is known autonomous driving which automates driving of a vehicle by using sensors such as a camera and a radar. Patent Reference-1 discloses a technique for giving notice of becoming incapable of performing autonomous driving and/or directing the driver to a safe location at the time of detecting that necessary requirements for performing autonomous driving becomes unsatisfied.

Patent Reference-1: Japanese Patent Application Laid-open under No. 2014-106854

DISCLOSURE OF INVENTION

Problem to be Solved by the Invention

When a vehicle approaches a location where autonomous driving cannot be performed such as a location where sensors necessary to perform autonomous driving do not work, switching from autonomous driving to manual driving is required. In this case, if notice is given at the time when the necessary requirement for performing autonomous driving becomes unsatisfied, the driver does not have enough time to deal with manual driving.

The above is an example of the problem to be solved by the present invention. An object of the present invention is to provide a route search device capable of preferably informing a location where sufficient peripheral information necessary to perform autonomous driving cannot be acquired.

Means for Solving the Problem

One invention is a route search device including: an acquirement unit configured to acquire information on surroundings of a moving body; a route search unit configured to search for or estimate a moving route where the moving body moves; an environment acquirement unit configured to acquire environment information on surroundings of the moving route searched for or estimated by the route search unit; an extraction unit configured to extract, based on the environment information acquired by the environment acquirement unit, a location on which an accuracy of the acquirement by the acquirement unit is predicted not to meet a predetermined standard from the moving route searched for or estimated by the route search unit; and an informing unit configured to inform a user of the location extracted by the extraction unit.

Another invention is a control method executed by a route search device, including: an acquirement process to acquire information on surroundings of a moving body; a route search process to search for or estimate a moving route where the moving body moves; an environment acquirement process to acquire environment information on surroundings of the moving route searched for or estimated by the route search process; an extraction process to extract, based on the environment information acquired by the environment acquirement process, a location on which an accuracy of the acquirement by the acquirement process is predicted not to meet a predetermined standard from the moving route searched for or estimated by the route search process; and an informing process to inform a user of the location extracted by the extraction process.

Still another invention is a program executed by a computer, making the computer function as: an acquirement unit configured to acquire information on surroundings of a moving body; a route search unit configured to search for or estimate a moving route where the moving body moves; an environment acquirement unit configured to acquire environment information on surroundings of the moving route searched for or estimated by the route search unit; an extraction unit configured to extract, based on the environment information acquired by the environment acquirement unit, a location on which an accuracy of the acquirement by the acquirement unit is predicted not to meet a predetermined standard from the moving route searched for or estimated by the route search unit; and an informing unit configured to inform a user of the location extracted by the extraction unit.

DETAILED DESCRIPTION OF THE PREFERRED EMBODIMENTS

According to a preferable embodiment of the present invention, there is provided a route search device including: an acquirement unit configured to acquire information on surroundings of a moving body; a route search unit configured to search for or estimate a moving route where the moving body moves; an environment acquirement unit configured to acquire environment information on surroundings of the moving route searched for or estimated by the route search unit; an extraction unit configured to extract, based on the environment information acquired by the environment acquirement unit, a location on which an accuracy of the acquirement by the acquirement unit is predicted not to meet a predetermined standard from the moving route searched for or estimated by the route search unit; and an informing unit configured to inform a user of the location extracted by the extraction unit.

The above route search device includes an acquirement unit, a route search unit, an environment acquirement unit, an extraction unit and an informing unit. The acquirement unit is configured to acquire information on surroundings of a moving body. The route search unit is configured to search for or estimate a moving route where the moving body moves. The environment acquirement unit is configured to acquire environment information on surroundings of the moving route searched for or estimated by the route search unit. The extraction unit is configured to extract, based on the environment information acquired by the environment acquirement unit, a location on which an accuracy of the acquirement by the acquirement unit is predicted not to meet a predetermined standard from the moving route. The informing unit is configured to inform a user of the location extracted by the extraction unit. According to this mode, the route search device can preliminarily inform the user of the existence of such a location that peripheral information cannot be acquired with a sufficient accuracy required to perform autonomous driving.

In one mode of the route search device, the route search device further includes an autonomous driving control unit configured to perform autonomous driving of a vehicle based on the information on the surroundings acquired by the acquirement unit, wherein the predetermined standard is a standard for determining whether or not the accuracy of the acquirement by the acquirement unit meets an accuracy required to perform the autonomous driving. According to this mode, the route search device can predict such a location that peripheral information cannot be acquired with a sufficient accuracy required to perform autonomous driving, and can inform the user thereof.

In another mode of the route search device, the informing unit is configured to output a warning of an inability to continue to perform the autonomous driving shortly if the moving body comes close to the location extracted by the extraction unit within a predetermined distance. According to this mode, the route search device can prevent the sudden stop of autonomous driving and switching to manual driving despite no time for a driver to deal with manual driving.

In still another mode of the route search device, the informing unit is configured, at a time when the autonomous driving is not turned off despite an alert issued to prompt an input for turning off the autonomous driving, to guide the moving body to a location where the moving body is able to stop before the moving body entering the location extracted by the extraction unit. According to this mode, the route search device can let the user stand by at a safe location before switching from autonomous driving to manual driving.

In still another mode of the route search device, the route search device further includes a safe location search unit configured to search for the location where the moving body is able to stop at a time when the extraction unit extracts the location on which the accuracy of the acquirement by the acquirement unit is predicted not to meet the predetermined standard. Thereby, the route search device can smoothly guide the user to a predetermined safe location.

In still another mode of the route search device, the route search unit is configured, in a case where the location extracted by the extraction unit is included in the moving route, to search for another moving route which does not include the location extracted by the extraction unit. According to this mode, the route search device can preferably avoid running on a section where the accuracy of the acquirement by the acquirement unit does not meet a predetermined standard.

In still another mode of the route search device, the route search device further includes a communication unit configured to communicate with a server device which receives and stores information generated by plural moving bodies based on output of sensors thereof, wherein the environment acquirement unit is configured to acquire information from the server device as the environment information, the information being generated by a moving body passing through the moving route or a periphery thereof. According to this mode, the route search device acquires environment information on surroundings of the moving route thereby to precisely extract a location where the accuracy of the acquirement by the acquirement unit is predicted not to meet a predetermined standard.

In still another mode of the route search device, the route search device sends information on the location extracted by the extraction unit to the server device.

According to another preferable embodiment of the present invention, there is provided a control method executed by a route search device, including: an acquirement process to acquire information on surroundings of a moving body; a route search process to search for or estimate a moving route where the moving body moves; an environment acquirement process to acquire environment information on surroundings of the moving route searched for or estimated by the route search process; an extraction process to extract, based on the environment information acquired by the environment acquirement process, a location on which an accuracy of the acquirement by the acquirement process is predicted not to meet a predetermined standard from the moving route searched for or estimated by the route search process; and an informing process to inform a user of the location extracted by the extraction process. By executing the control method, the route search device can extract such a location that peripheral information cannot be acquired with a sufficient accuracy required to perform autonomous driving, and can preliminarily inform the user the existence thereof.

According to another preferable embodiment of the present invention, there is provided a program executed by a computer, making the computer function as: an acquirement unit configured to acquire information on surroundings of a moving body; a route search unit configured to search for or estimate a moving route where the moving body moves; an environment acquirement unit configured to acquire environment information on surroundings of the moving route searched for or estimated by the route search unit; an extraction unit configured to extract, based on the environment information acquired by the environment acquirement unit, a location on which an accuracy of the acquirement by the acquirement unit is predicted not to meet a predetermined standard from the moving route searched for or estimated by the route search unit; and an informing unit configured to inform a user of the location extracted by the extraction unit. By executing the program, the computer can extract such a location that peripheral information cannot be acquired with a sufficient accuracy required to perform autonomous driving, and can preliminarily inform the user the existence thereof. Preferably, the program can be treated in a state that it is stored in a storage medium.

EMBODIMENT

Now, a preferred embodiment of the present invention will be described below with reference to the attached drawings.

[Overview of Autonomous Driving System]

Figure 1:
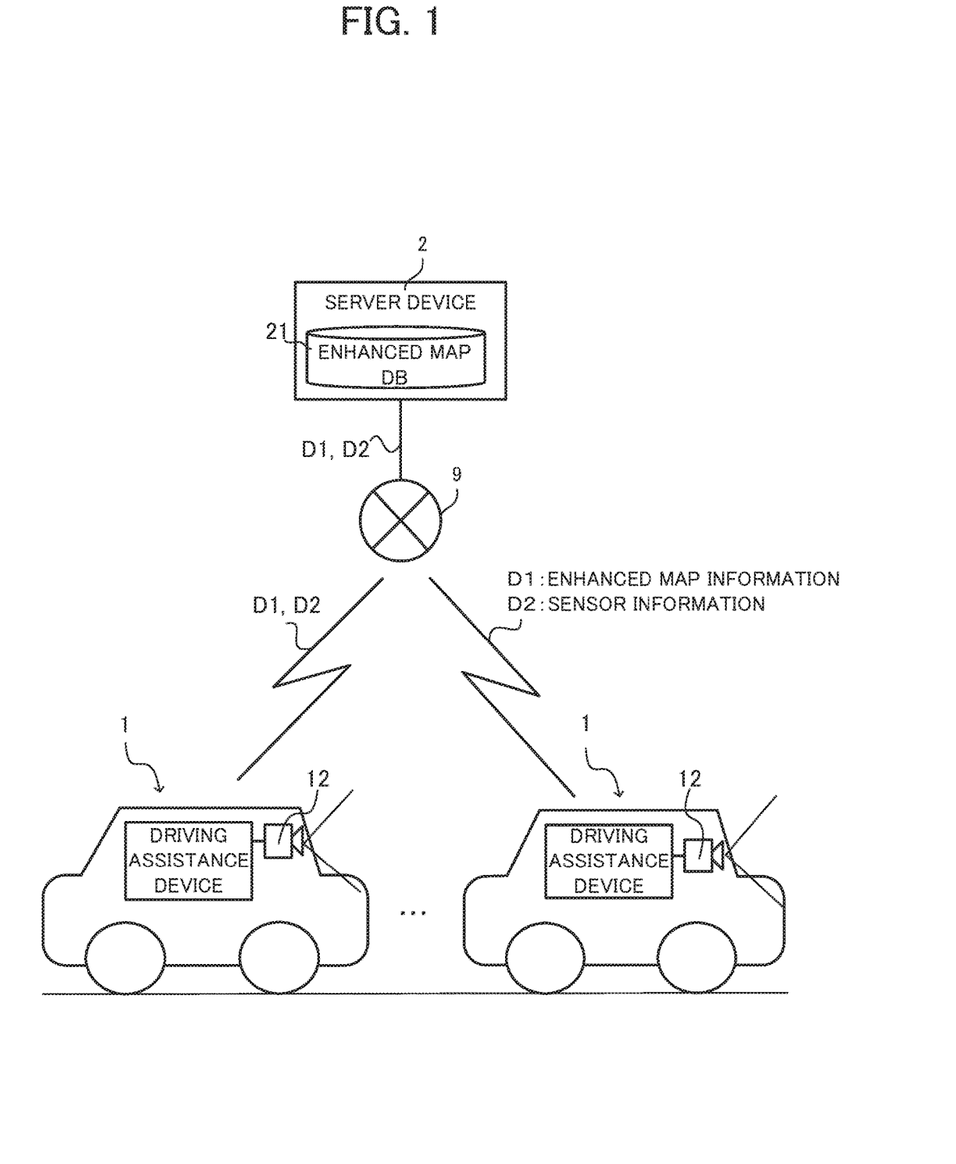
FIG. 1 illustrates a schematic configuration of an autonomous driving system.

FIG. 1 illustrates a schematic configuration of an autonomous driving system according to the embodiment. The autonomous driving system includes plural driving assistance devices 1 each of which moves together with each vehicle, and a server device 2 which communicates with each of the driving assistance devices 1 via a network 9. By updating the enhanced map DB (Database) 21 stored on the server device 2 with information measured by the driving assistance devices 1, the autonomous driving system stores information needed to determine whether or not autonomous driving can be performed.

The driving assistance devices 1 are stationary navigation devices or portable phones such as a smart phone, and acquire from the server device 2 detailed map information (referred to as "enhanced map information D1") which includes information necessary to perform autonomous driving. Then, on the basis of the received enhanced map information D1, the driving assistance devices 1 perform driving assistance such as a guidance of a route and autonomous driving. The driving assistance devices 1 send the server device 2 information (referred to as "sensor information D2") which is either output information from a sensor unit 12 such as a camera or recognized information based thereon. It is noted that the sensor information D2 includes time information indicating time when each of the driving assistance devices 1 generates the sensor information D2 and position information indicating a location where each of the driving assistance devices 1 generates the sensor information D2. Preferably, when there is a location where autonomous driving cannot be performed due to an absence of marks necessary to perform autonomous driving such as a road white line or due to a lack of the accuracy of the sensor unit 12 used to perform autonomous driving, the driving assistance devices 1 send the server device 2 information on the location as actual result information on autonomous driving.

Additionally, according to the embodiment, on the basis of the enhanced map information D1 received, each of the driving assistance devices 1 predicts a point or a section (referred to as "autonomous driving unsuitable location Pn") unsuitable for performing autonomous driving on the predetermined route. Each of the driving assistance devices 1 is an example of "the route search device" according to the present invention.

The server device 2 stores the enhanced map DB 21 and updates the enhanced map DB 21 by receiving the sensor information D2 from each of the driving assistance devices 1. Here, the enhanced map DB 21 includes road data, traffic information, peripheral state information and weather information. Examples of the road data include map information on positions and shapes of roads, traffic lanes, traffic intersection, signs and buildings. The traffic information indicates traffic conditions of congested roads and the like. The peripheral state information indicates the state of surroundings of each road such as a lane restriction due to a traffic accident or constructions. The weather information indicates present or forecasted weather on each road. In response to a request from a driving assistance device 1, the server device 2 extracts data corresponding to an area where the driving assistance device 1 exists or data corresponding to surroundings of a route set by the driving assistance device 1, and sends the data to the driving assistance device 1 as the enhanced map information D1.

[Block Configuration]

Figure 2:
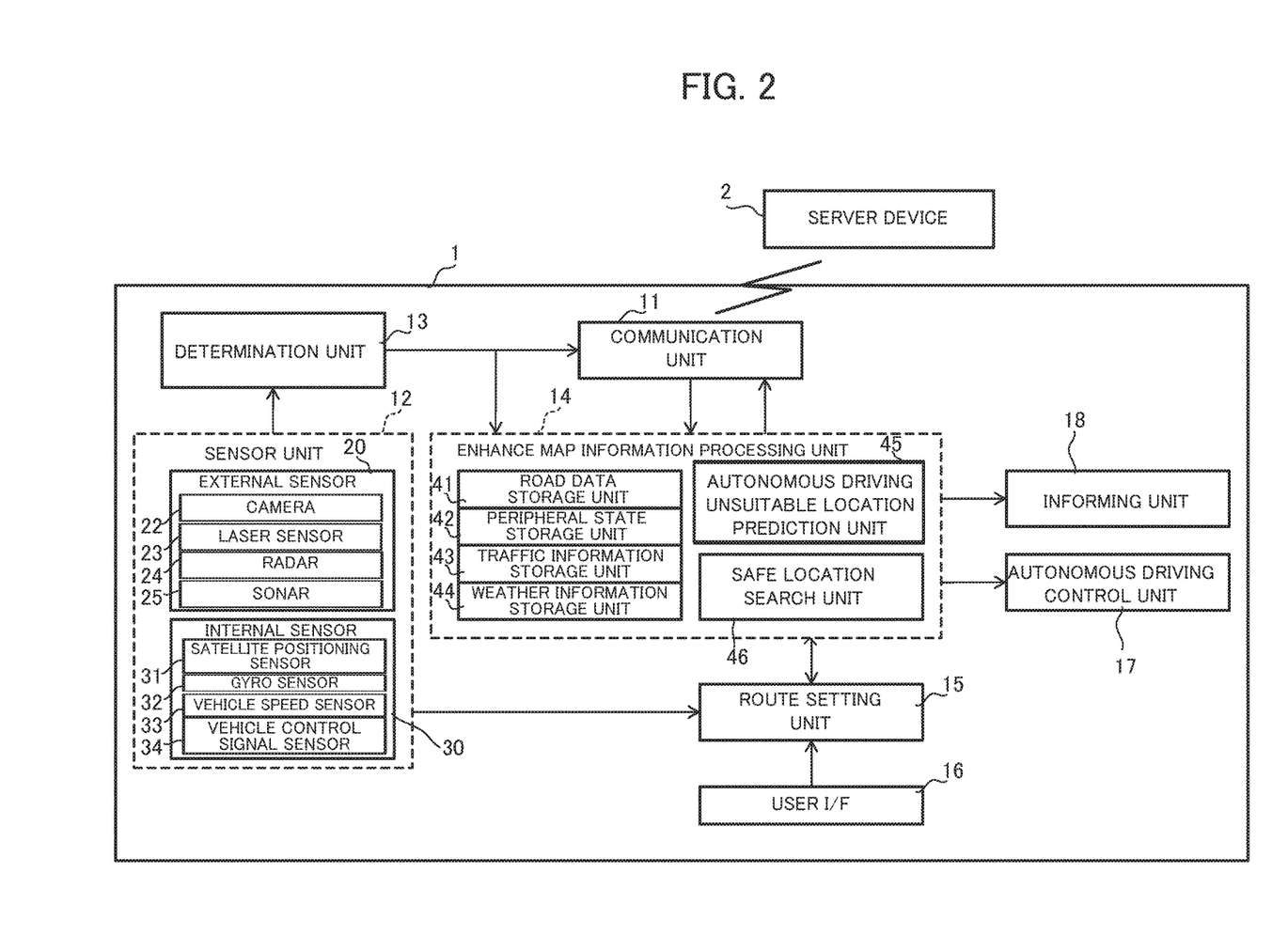
FIG. 2 is a block diagram of a driving assistance device.

FIG. 2 is a block diagram indicating a functional configuration of a driving assistance device 1. As illustrated in FIG. 2, the driving assistance device 1 mainly includes a communication unit 11, a sensor unit 12, a determination unit 13, an enhanced map information processing unit 14, a route setting unit 15, a user interface (also referred to as "user I/F") 16, an autonomous driving control unit 17 and an informing unit 18.

The communication unit 11 communicates with the server device 2 thereby to receive the enhanced map information D1 and send the sensor information D2. It is noted that the communication unit 11 may communicate with other driving assistance devices 1 mounted on other vehicles thereby to exchange position information and the like with them.

The sensor unit 12 includes an external sensor 20 and an internal sensor 30, and generates information on a vehicle (own vehicle) moving together with the driving assistance device 1. The external sensor 20 is a sensor for acquiring information on surroundings of the own vehicle, and includes a camera 22, a laser sensor 23 such as a LIDAR (Light Detection and Ranging or Laser Illuminated Detection and Ranging), a radar 24 and a sonar 25. The internal sensor 30 is a sensor which detects the state of the own vehicle, and includes a satellite positioning sensor 31 such as a GPS receiver, a gyro sensor 32, a vehicle speed sensor 33 and a vehicle control signal sensor 34 for acquiring from the vehicle various kinds of information such as information on the state of a direction indicator. Output signals from the external sensor 20 and the internal sensor 30 are supplied to the determination unit 13 and the route setting unit 15. The sensor unit 12 is an example of "the acquirement unit" according to the present invention.

The determination unit 13 determines the position of the own vehicle, the state of the own vehicle and the peripheral state of the own vehicle based on the output signals from the sensor unit 12. For example, in order to precisely estimate the own vehicle position necessary to perform autonomous driving, the determination unit 13 estimates the own vehicle position not only by the output of the satellite positioning sensor 31 but also by recognizing the road white line(s) on the lane where the own vehicle is running and the position of traffic sign(s) ahead of the own vehicle based on the output of the external sensor 20 including the camera 22. The determination unit 13 recognizes the running state and the driving operation state of the own vehicle including running speed information and traveling direction information regarding the own vehicle based on the output of the internal sensor 30 including the vehicle speed sensor 33 and the vehicle control signal sensor 34. Furthermore, on the basis of the output of the external sensor 20, the determination unit 13 recognizes a peripheral state of the road where the own vehicle is running, wherein examples of the peripheral state include a traffic accident location, a restricted lane and a newly established lane. The determination unit 13 supplies the enhanced map information processing unit 14 with information recognized based on the output of the sensor unit 12. Additionally, the determination unit 13 supplies the communication unit 11 with the output information acquired from the sensor unit 12 or information recognized based thereon as the sensor information D2.

The enhanced map information processing unit 14 performs predetermined processing based on the enhanced map information D1 received from the server device 2 and/or information received from the determination unit 13, and includes a road data storage unit 41, a peripheral state storage unit 42, a traffic information storage unit 43, a weather information storage unit 44, an autonomous driving unsuitable location prediction unit 45 and a safe location search unit 46. The enhanced map information processing unit 14 is an example of "the environment acquirement unit" according to the present invention.

The road data storage unit 41 stores road data and facility information which are preliminarily recorded as map information. It is noted that the road data storage unit 41 may update the stored road data based on the enhanced map information D1 as necessary.

The peripheral state storage unit 42 stores information on peripheral state of a road specified by the enhanced map information D1 or information received from the determination unit 13. If the enhanced map information D1 includes information on actual result of whether or not autonomous driving can be performed on a road where other vehicles have already run, the peripheral state storage unit 42 stores the information on the actual result. If the enhanced map information D1 includes information on whether or not there are any marks along a road such as a road white line or a sign necessary for the sensor unit 12 to recognize in order to perform autonomous driving, the peripheral state storage unit 42 also stores that information.

The traffic information storage unit 43 stores traffic information on traffic jams and traffic restrictions included in the enhanced map information D1. It is noted that the traffic information storage unit 43 may receive and store traffic information on traffic jams and traffic restrictions delivered from a VICS (registered trademark, Vehicle Information Communication System) center. The weather information storage unit 44 stores weather information included in the enhanced map information D1 or weather information corresponding to the own vehicle position and its periphery, wherein the latter weather information is received by the communication unit 11 from a server (not shown) which stores weather information corresponding to various regions.

On the basis of information ("environment information") stored on the road data storage unit 41, the peripheral state storage unit 42, the traffic information storage unit 43 and the weather information storage unit 44, the autonomous driving unsuitable location prediction unit 45 predicts an autonomous driving unsuitable location Pn existing on the route set by the route setting unit 15 to be described later. In this case, the autonomous driving unsuitable location prediction unit 45 recognizes a section existing on or near the predetermined route as an autonomous driving unsuitable location Pn, wherein the section is estimated that the accuracy (referred to as "sensor accuracy") of detections through the sensor unit 12 with respect to obstructions such as a vehicle in front and a pedestrian and marks for driving such as a road white line does not meet an accuracy (referred to as "standard accuracy") required to perform autonomous driving. The above standard accuracy is an example of "the predetermined standard" according to the present invention.

In this case, for example, on the basis of information stored on the peripheral state storage unit 42 and the weather information storage unit 44, the autonomous driving unsuitable location prediction unit 45 determines that the sensor accuracy during running on such a section that there are rainfalls or snow falls whose amount is higher than a standard value or that there is road surface freezing or heavy fog does not meet the standard accuracy, and recognizes the section as an autonomous driving unsuitable location Pn. In this case, the autonomous driving unsuitable location prediction unit 45 may calculate each expected time of arrival of the own vehicle corresponding to each point on the route to determine whether or not every point on the route corresponds to an autonomous driving unsuitable location Pn based on weather forecast at each expected time of the arrival. In another example, if the autonomous driving unsuitable location prediction unit 45 detects, on the basis of the environment information, such a section that there is no detectable marks such as a road white line, a sign, and a building necessary for the sensor to perform autonomous driving, the autonomous driving unsuitable location prediction unit 45 determines that the sensor accuracy during running on the section does not meet the standard accuracy and recognizes the section as an autonomous driving unsuitable location Pn. In still another example, if the autonomous driving unsuitable location prediction unit 45 detects, on the basis of the environment information, a section where another vehicle ran and could not perform autonomous driving, the autonomous driving unsuitable location prediction unit 45 determines that the sensor accuracy during running on the section does not meet the standard accuracy and recognizes the section as an autonomous driving unsuitable location Pn.

Preferably, when detecting an autonomous driving unsuitable location Pn, the autonomous driving unsuitable location prediction unit 45 sends information on the detected autonomous driving unsuitable location Pn to the server device 2 via the communication unit 11. In this case, preferably, the server device 2 stores the sent information on the autonomous driving unsuitable location Pn on the enhanced map DB 21 or updates the enhanced map DB 21 by using the sent information. The autonomous driving unsuitable location prediction unit 45 is an example of "the extraction unit" according to the present invention.

The safe location search unit 46 detects, in a case where there is an autonomous driving unsuitable location Pn along the predetermined route, a location (simply referred to as "safe location") where a vehicle can safely stop before the vehicle enters the autonomous driving unsuitable location Pn. Here, the safe location is a location where a vehicle can safely stop and examples of the safe location include a parking lot, an empty lot and a parking facility. For example, on the basis of the facility information stored on the road data storage unit 41, the safe location search unit 46 searches for a location which is available at the expected time of the arrival of the vehicle and is near the autonomous driving unsuitable location Pn. Preferably, when detecting a safe location, the safe location search unit 46 sends information on the detected safe location to the server device 2 via the communication unit 11.

The route setting unit 15 searches for a route to a destination inputted through the user I/F 16. According to the embodiment, as describe later, when the destination is set, the route setting unit 15 searches for a recommended route in consideration of conditions (i.e., time, distance and/or toll) other than the condition on whether or not autonomous driving can be performed. Then, in a case where any autonomous driving unsuitable location Pn exists on the route set by the route setting unit 15, the route setting unit 15 also searches for a route (referred to as "avoidance route") to the destination which avoids the autonomous driving unsuitable location Pn. The route setting unit 15 is an example of "the route search unit" according to the present invention.

The user I/F 16 is an interface for the user to input the destination and to turn autonomous driving on or off. Examples of the user I/F 16 include a button, a switch, a touch panel and a remote controller.

The autonomous driving control unit 17 performs autonomous driving of the vehicle based on the route set by the route setting unit 15 if the setting of autonomous driving is on-state. For example, while performing autonomous driving, the autonomous driving control unit 17 controls the vehicle by adjusting the acceleration amount, the brake amount and the steering angle based on peripheral state of the own vehicle recognized by the determination unit 13.

Under the control of the enhanced map information processing unit 14, the informing unit 18 displays a predetermined image on a display and/or outputs predetermined sound (voice) through an audio output device. For example, according to the embodiment, when there is an autonomous driving unsuitable location Pn on the predetermined route, the informing unit 18 informs the existence of the autonomous driving unsuitable location Pn and suggests an avoidance route which the route setting unit 15 searches for. The display example of the informing unit 18 will be described in detail in the section "Display Example".

A CPU, which functions as the determination unit 13, the enhanced map information processing unit 14, the route setting unit 15, the autonomous driving control unit 17 and the informing unit 18, is an example of a computer which executes the program according to the present invention.

[Process Flow]

Next, with reference to FIGS. 3 and 4, a description will be given of the process which the driving assistance device 1 executes.

(1) Process Prior to Drive Based on Autonomous Driving

Figure 3:
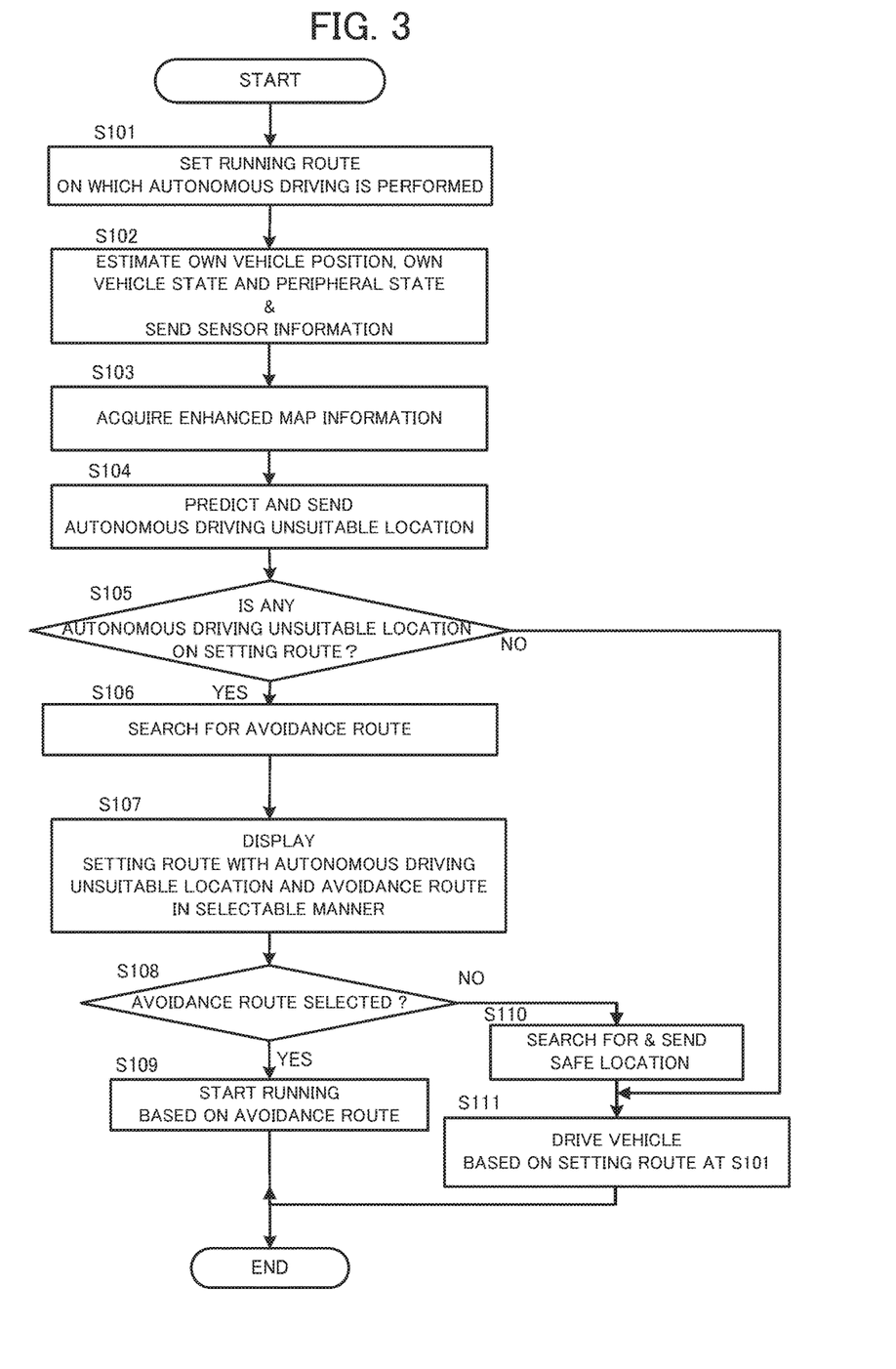
FIG. 3 is a flowchart indicating a procedure of a process at the time of setting a route.

FIG. 3 is a flowchart indicating a procedure of a route setting process prior to drive based on autonomous driving. The driving assistance device 1 executes the process of the flowchart illustrated in FIG. 3 at the time when the destination is specified through the user I/F 16.

First, by searching for a route to destination specified by the user I/F 16, the route setting unit 15 of the driving assistance device 1 sets a running route where autonomous driving is to be performed (step S101). In this case, the route setting unit 15 searches for a recommended route in consideration of conditions (i.e., time, distance and/or toll) other than the condition on whether or not autonomous driving can be performed. Then, the determination unit 13 estimates the own vehicle position, the own vehicle state and the peripheral state based on the output of the sensor unit 12 (step S102). The determination unit 13 also sends information on the estimation result and output information of the sensor unit 12 to the server device 2 via the communication unit 11 as the sensor information D2.

The enhanced map information processing unit 14 receives the enhanced map information D1 from the server device 2 via the communication unit 11 (step S103). Then, the enhanced map information processing unit 14 stores the received enhanced map information D1 as the environment information on the road data storage unit 41, the peripheral state storage unit 42, the traffic information storage unit 43 and the weather information storage unit 44.

On the basis of the environment information in which the enhanced map information D1 is reflected, the autonomous driving unsuitable location prediction unit 45 of the enhanced map information processing unit 14 predicts an autonomous driving unsuitable location Pn existing on or around the route set at step S101 (step S104). Preferably, when detecting an autonomous driving unsuitable location Pn, the autonomous driving unsuitable location prediction unit 45 sends information on the detected autonomous driving unsuitable location Pn to the server device 2.

The autonomous driving unsuitable location prediction unit 45 determines whether or not there exists an autonomous driving unsuitable location Pn on the running route set at step S101 (step S105). Then, if there exists an autonomous driving unsuitable location Pn on the running route set at step S101 (step S105; Yes), the route setting unit 15 searches for an avoidance route (step S106). In contrast, if there exists no autonomous driving unsuitable location Pn on the running route set at step S101 (step S105; No), the autonomous driving control unit 17 starts to drive the vehicle based on the route set at step S101 (step S111).

After searching for the avoidance route at step S106, the informing unit 18 displays the running route set at step S101 together with the autonomous driving unsuitable location(s) Pn and the avoidance route in a selectable manner (step S107). Thereby, the informing unit 18 lets the user recognize the position of the autonomous driving unsuitable location Pn and select whether to run on the running route set at step S101 or on the avoidance route. The Display example at step S107 will be described later.

When the avoidance route is selected (step S108; Yes), the autonomous driving control unit 17 starts to drive the vehicle based on the avoidance route (step S109). Thereby, the driving assistance device 1 can start to perform autonomous driving based on such a route that switching to manual driving is not needed.

When the avoidance route is not selected (step S108; No), i.e., when the running route set at step S101 is selected, the safe location search unit 46 searches for a safe location where the vehicle is able to drop by before entering the autonomous driving unsuitable location Pn (step S110). As described later, the safe location searched for at step S110 is used for a target of the guidance executed at the time when the vehicle comes close to the autonomous driving unsuitable location Pn. The safe location search unit 46 sends information on the safe location to the server device 2. Then, the autonomous driving control unit 17 starts to drive the vehicle based on the route set at step S101 (step S111).

(2) Process During Running Based on Autonomous Driving

Figure 4:
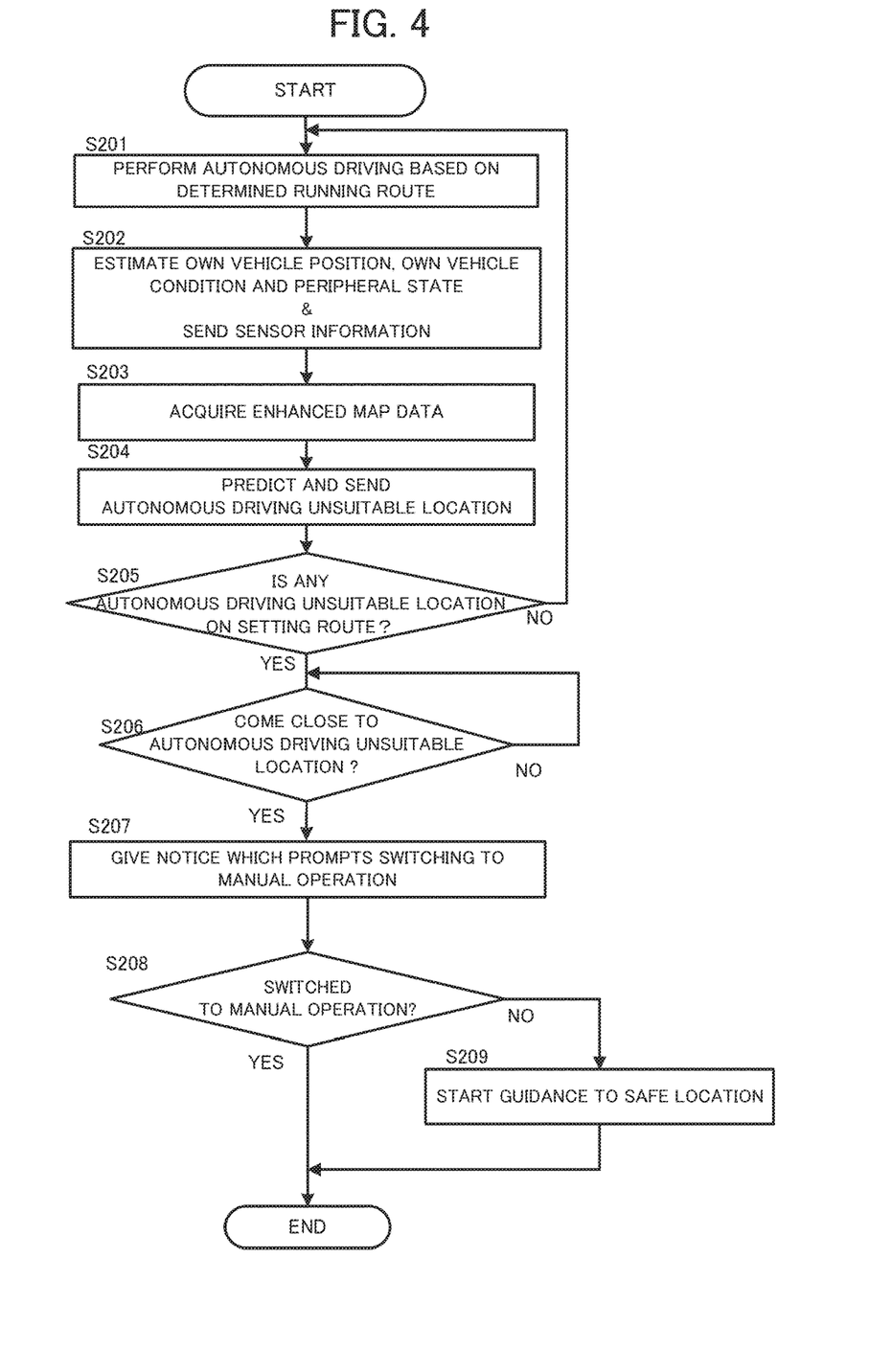
FIG. 4 is a flowchart indicating a procedure of a process executed by the driving assistance device during running based on autonomous driving.

FIG. 4 is a flowchart indicating a procedure of the process executed by the driving assistance device 1 during running based on autonomous driving. The driving assistance device 1 executes the process of the flowchart illustrated in FIG. 4 at the time of starting to drive the vehicle based on autonomous driving.

First, the autonomous driving control unit 17 performs autonomous driving based on the predetermined running route (step S201). Then, the determination unit 13 estimates the own vehicle position, the own vehicle state and the peripheral state based on the output of the sensor unit 12 (step S202). The determination unit 13 also sends information on the estimation result and output information of the sensor unit 12 to the server device 2 via the communication unit 11 as the sensor information D2.

Next, the enhanced map information processing unit 14 receives the enhanced map information D1 from the server device 2 via the communication unit 11 (step S203). Then, the enhanced map information processing unit 14 stores the received enhanced map information D1 as the environment information on the road data storage unit 41, the peripheral state storage unit 42, the traffic information storage unit 43 and the weather information storage unit 44.

On the basis of the environment information in which the enhanced map information D1 is reflected, the autonomous driving unsuitable location prediction unit 45 of the enhanced map information processing unit 14 predicts an autonomous driving unsuitable location Pn existing on or around the route set at step S101 (step S204). Preferably, when detecting the autonomous driving unsuitable location Pn, the autonomous driving unsuitable location prediction unit 45 sends information on the detected autonomous driving unsuitable location Pn to the server device 2.

The autonomous driving unsuitable location prediction unit 45 determines whether or not there exists an autonomous driving unsuitable location Pn on the predetermined running route (step S205). Then, if there exists an autonomous driving unsuitable location Pn on the predetermined running route (step S205; Yes), the autonomous driving unsuitable location prediction unit 45 determines whether or not the vehicle comes close to the autonomous driving unsuitable location Pn within a predetermined distance (step S206). The above-mentioned predetermined distance is determined in consideration of time needed to perform a switching operation to manual driving and time needed for a driver to prepare for manual driving after switching to manual driving. In contrast, if there exists no autonomous driving unsuitable location Pn on the predetermined running route (step S205; No), the driving assistance device 1 executes each process at step S201 to S205 again and determines whether or not an autonomous driving unsuitable location Pn occurs on the predetermined route as time goes by.

When the vehicle comes close to the autonomous driving unsuitable location Pn within the predetermined distance (step S206; Yes), the informing unit 18 gives notice which prompts switching to manual driving through an audio guidance or a display (step S207). Then, the driving assistance device 1 determines whether or not an operation for switching to manual driving is detected through the user I/F 16 (step S208). Then, when the driving assistance device 1 detects an operation for switching to manual driving in a predetermined time after the notice at S207 (step S208; Yes), the driving assistance device 1 terminates autonomous driving and ends the process of the flowchart.

When the driving assistance device 1 does not detect any operation for switching to manual driving in the predetermined time after the notice at S207 (step S208; No), the driving assistance device 1 starts to guide the vehicle to the safe location (step S209). Preferably, in this case, the driving assistance device 1 guides the vehicle to the safe location detected at step S110 in FIG. 3.

Display Example

Figure 5:
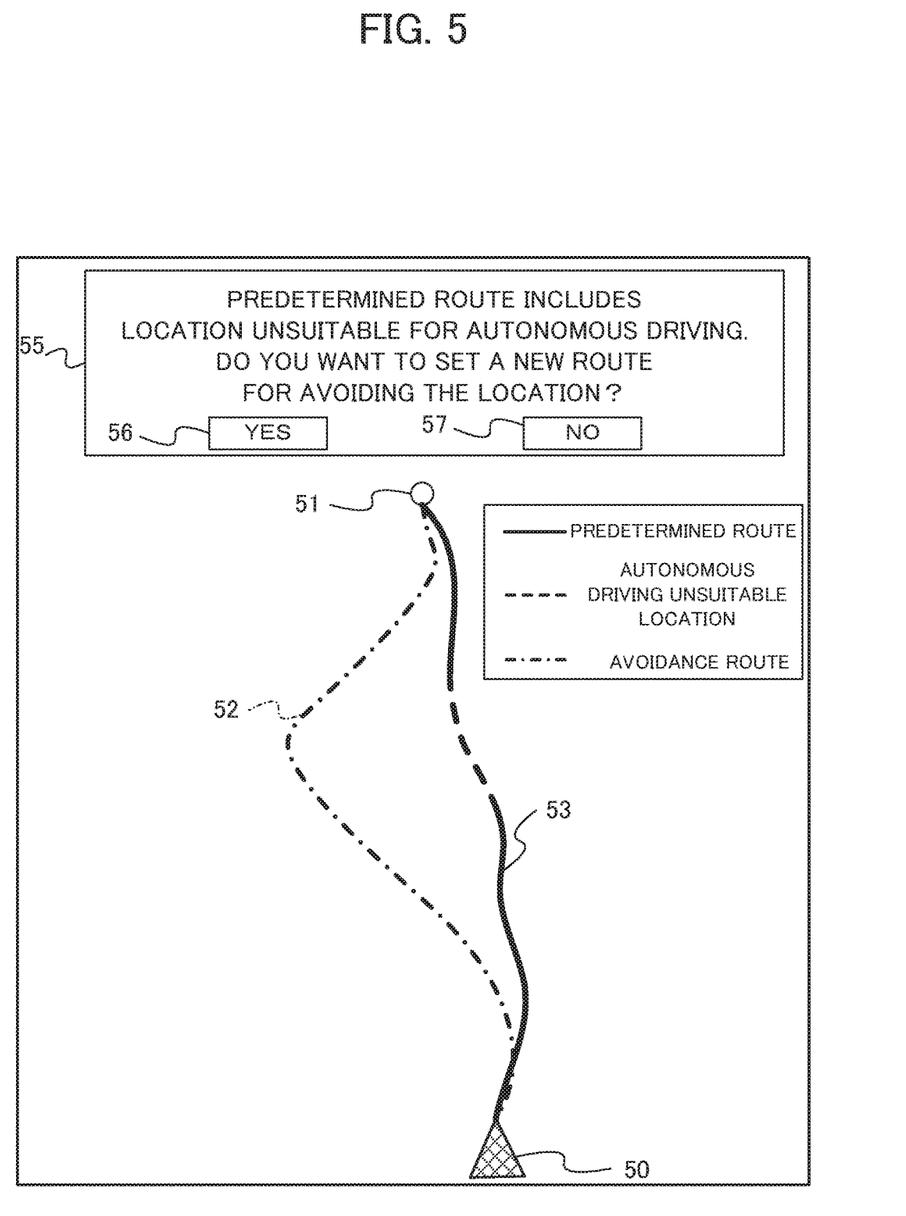
FIG. 5 illustrates a display example which suggests an avoidance route.

FIG. 5 illustrates a display example displayed by the informing unit 18 at the time of setting a route at step S107 in FIG. 3. In FIG. 5, the mark 50 indicates the present position of the vehicle and the position 51 indicates the position of the destination.

According to FIG. 5, the informing unit 18 displays an avoidance route 52 in addition to a predetermined route 53 set at step S101 on the map (not shown). In the case of the example illustrated in FIG. 5, the informing unit 18 displays the predetermined route 53 so that the section of the autonomous driving unsuitable location Pn and the sections other than the autonomous driving unsuitable location Pn are differently displayed (e.g., differently colored). Thereby, the informing unit 18 lets the user preferably recognize the position of the autonomous driving unsuitable location Pn.

Furthermore, on the screen illustrated in FIG. 5, the informing unit 18 displays a window 55 including buttons 56 and 57 for selecting whether or not to set the avoidance route as a running route instead of the predetermined route 53. When the driving assistance device 1 detects the YES button 56 pushed, the autonomous driving control unit 17 starts to perform autonomous driving based on the avoidance route 52. In contrast, when the driving assistance device 1 detects the NO button 57 pushed, the autonomous driving control unit 17 starts to perform autonomous driving based on the predetermined route 53.

Figure 6:
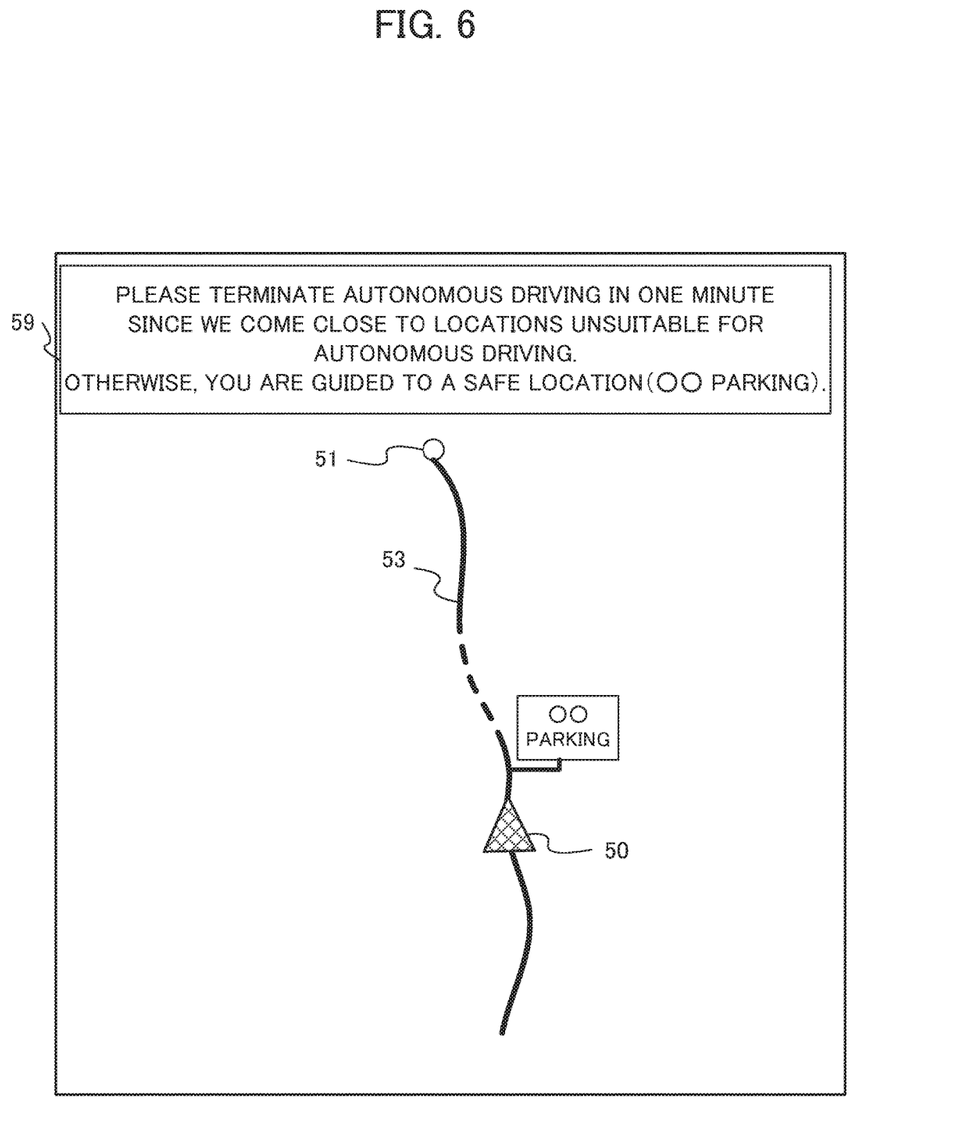
FIG. 6 illustrates a display example at the time of approaching an autonomous driving unsuitable location.

FIG. 6 illustrates a display example displayed by the informing unit 18 at step S207 in FIG. 4. According to FIG. 6, in response to the selection of the No button 57 in FIG. 5, the driving assistance device 1 performs autonomous driving based on the predetermined route 53 including an autonomous driving unsuitable location Pn.

In this case, since the vehicle comes close to the autonomous driving unsuitable location Pn within the predetermined distance, the informing unit 18 displays a windows 59 which prompts switching to manual driving according to step S207. Additionally, on the window 59, the informing unit 18 displays a warning that the guidance to a safe location (in this case, "oo parking") preliminary searched for at step S110 in FIG. 3 starts if there is no operation for switching to manual driving in a predetermined time (one minute in this case). Furthermore, according to FIG. 6, the informing unit 18 illustrates the position of the safe location "oo parking" and a route to the location on the map. In the case of the example illustrated in FIG. 6, as with the example illustrated in FIG. 5, the informing unit 18 displays the predetermined route 53 so that the section of the autonomous driving unsuitable location Pn and the sections other than the autonomous driving unsuitable location Pn are displayed in different manners.

As described above, the enhanced map information processing unit 14 of the driving assistance device 1 according to the embodiment acquires from the determination unit 13 information on surroundings of the vehicle which is necessary to perform autonomous driving, and also acquires from the server device 2 environment information on surroundings of a route on which autonomous driving is to be performed. On the basis of the acquired environment information, the enhanced map information processing unit 14 extracts, as an autonomous driving unsuitable location Pn, a location at which the accuracy of the acquirement of the sensor unit 12 is predicted not to satisfy a standard for acquiring the information on the surroundings of the vehicle needed to perform autonomous driving. The informing unit 18 informs the extracted autonomous driving unsuitable location Pn to a user. According to this mode, on the basis of the environment information, the driving assistance device 1 can extract such an autonomous driving unsuitable location Pn that the information on the surroundings of the vehicle with a sufficient accuracy required to perform autonomous driving cannot be acquired, and inform the user of the existence thereof in advance.

[Modification]

Hereinafter, preferable modifications of the embodiment will be described. Each modification can be applied to the embodiment in combination.

(First Modification)

The driving assistance device 1 performs autonomous driving after searching for a route to the destination specified by the user I/F 16. Instead, even in a case that any destination is not specified, by referring to the past traveling history of the vehicle, the driving assistance device 1 may estimate a route where the vehicle should advance and perform autonomous driving based on the estimated route. In this case, the driving assistance device 1 stores information on roads where the vehicle ran as the traveling history, and predicts a running route by using known statistical means with reference to the traveling history. Then, for example, the driving assistance device 1 performs autonomous driving based on the predicted route if the degree of accuracy of the predicted route is equal to or higher than a predetermined value.

(Second Modification)

The flowcharts in FIGS. 3 and 4 are merely examples and procedures to which the present invention can be applied are not limited to them.

For example, in the case of FIG. 3, instead of searching for a safe location only when the avoidance route is not selected, the driving assistance device 1 may search for a safe location and predict an autonomous driving unsuitable location Pn at the same time. In this case, the driving assistance device 1 searches for a safe location regardless of whether or not an autonomous driving unsuitable location Pn is detected. In another example, while running according to autonomous driving, the driving assistance device 1 may repeatedly and continuously search for a safe location which is preferable to drop by from the present position. Instill another example, the driving assistance device 1 may search for an autonomous driving unsuitable location Pn only at the time of setting a route and may not search for an autonomous driving unsuitable location Pn again at the time of performing autonomous driving. Namely, in this case, the driving assistance device 1 does not execute the process at step S204 in FIG. 4.

(Third Modification)

The server device 2 may execute the prediction process of an autonomous driving unsuitable location Pn in substitution for the autonomous driving unsuitable location prediction unit 45.

In this case, with reference to the enhanced map DB 21, the server device 2 detects an autonomous driving unsuitable location Pn existing on roads each registered in the enhanced map DB 21 in a similar way as detecting the autonomous driving unsuitable location Pn by the autonomous driving unsuitable location prediction unit 45. Then, the server device 2 stores on the enhanced map DB 21 information on the detected autonomous driving unsuitable location Pn as information on road conditions. The server device 2 also sends the enhanced map information D1 including the information on the autonomous driving unsuitable location Pn to the driving assistance device 1. Even in this mode, preferably, the driving assistance device 1 acquires an autonomous driving unsuitable location Pn predicted based on the environment information to inform the user thereof.

(Fourth Modification)

Preferably, during performing autonomous driving, when the vehicle comes close to a predetermined location estimated to need an attention other than autonomous driving unsuitable locations Pn, the driving assistance device 1 warns the driver to pay attention to the predetermined location. Examples of the predetermined location include a school zone, a silver zone and a residential area.

(Fifth Modification)

A server system including a plurality of server devices may executes the process of the server device 2 explained in the above embodiment. In this case, each of the server devices executes a process assigned in advance by receiving information needed to execute the process from the other server devices as necessary.

(Sixth Modification)

The driving assistance device 1 may receive weather information from a server device collecting weather information other than the server device 2 and stores the weather information on the weather information storage unit 44 if the weather information is neither registered in the enhanced map DB 21 nor included in the enhanced map information D1.

BRIEF DESCRIPTION OF REFERENCE NUMBERS

1 Driving assistance device
2 Server device
9 Network
11 Communication unit
12 Sensor unit
13 Determination unit
14 Enhanced map information processing unit
15 Route setting unit
16 User I/F
17 Autonomous driving control unit
18 Informing unit
21 Enhanced map DB

The invention claimed is:

1. A route search device comprising:
a sensor acquiring information associated with surroundings of a moving body; and
a processor configured to:
search for or estimate a moving route of the moving body;
acquire environment information on surroundings of the moving route; and
provide information indicating that the moving route has been modified, based on the environment information on the surroundings, to avoid a section or a point on which autonomous driving by the sensor is unsuitable.

2. The route search device of claim 1, wherein the section or the point on which autonomous driving is unsuitable comprises at least one of:
a section having rainfall or snow fall higher than a standard value, a road surface freezing, or heavy fog that does not meet a standard accuracy;
a section having no detectable marks such as a road white line, a sign, or a building for a sensor to perform autonomous driving; and
a section where another vehicle previously operated and could not perform autonomous driving.

3. A route search device comprising:
a sensor acquiring information on surroundings of a moving body; and
a processor configured to:
search for or estimate a moving route where the moving body moves;
acquire environment information on surroundings of the moving route searched for or estimated by the route search unit; and
inform a user of the moving route,
wherein the processor is further configured to, based on the environment information, search for or estimate the moving route avoiding a section or a point on which performing autonomous driving by use of the sensor is unsuitable.

4. The route search device of claim 3, wherein the moving route comprises a first moving route where the moving body moves, and the processor is configured to, based on the environment information, search for or estimate a second moving route avoiding a section or a point which is on the first moving route and on which performing autonomous driving by use of the sensor is unsuitable.

5. The route search device according to claim 3,
wherein the moving route is modified by the processor to avoid a section or a point on at least one of a compartment line, a sign and a structure is not detectable by the sensor.

6. The route search device of claim 3, wherein the section or the point on which performing autonomous driving by use of the sensor is unsuitable comprises at least one of:
- a section having rainfall or snow fall higher than a standard value, a road surface freezing, or heavy fog that does not meet a standard accuracy;
- a section having no detectable marks such as a road white line, a sign, or a building for a sensor to perform autonomous driving; and
- a section where another vehicle previously operated and could not perform autonomous driving.

7. A route search method executed by a route search device, comprising:
- acquiring information associated with surroundings of a moving body;
- searching for or estimating a moving route of the moving body;
- acquiring environment information on surroundings of the moving route; and
- informing a user by providing information indicating that the moving route has been modified, based on the environment information on the surroundings, to avoid a section or a point on which autonomous driving by the sensor is unsuitable.

\* \* \* \* \*